(12) United States Patent
Schrock

(10) Patent No.: US 10,218,305 B1
(45) Date of Patent: Feb. 26, 2019

(54) END CLAMP FOR ATTACHING SOLAR PANELS TO ROOFS

(71) Applicant: Sunmodo Corporation, Vancouver, WA (US)

(72) Inventor: Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 15/953,888

(22) Filed: Apr. 16, 2018

(51) Int. Cl.
```
F16B 2/10      (2006.01)
F16B 2/18      (2006.01)
F16B 5/06      (2006.01)
F16B 5/12      (2006.01)
H02S 20/23     (2014.01)
H02S 30/10     (2014.01)
```

(52) U.S. Cl.
CPC ............... H02S 20/23 (2014.12); F16B 2/10 (2013.01); F16B 2/185 (2013.01); F16B 5/121 (2013.01); F16B 5/123 (2013.01); H02S 30/10 (2014.12); F16B 5/0685 (2013.01)

(58) Field of Classification Search
CPC .......... H02S 20/23; H02S 30/10; F16B 5/121; F16B 5/123; F16B 2/10; F16B 2/185; F16B 5/0685; Y10T 24/44291; Y10T 403/4674; B25B 5/103
See application file for complete search history.

(56) References Cited

U.S. PATENT DOCUMENTS

| | | | | |
|---|---|---|---|---|
| 1,988,240 A | * | 1/1935 | Ellis | B25B 5/109 |
| | | | | 24/569 |
| 4,901,963 A | * | 2/1990 | Yoder | B25B 5/103 |
| | | | | 24/489 |

(Continued)

FOREIGN PATENT DOCUMENTS

| | | |
|---|---|---|
| CN | 202151836 U | 2/2012 |
| CN | 202185391 U | 4/2012 |

(Continued)

OTHER PUBLICATIONS

Solarmount End Clamp Technical Drawing, Sheet SM-P04, Aug. 2014, Unirac, Albuquerque, New Mexico.

(Continued)

*Primary Examiner* — Phi D A
*Assistant Examiner* — Omar F Hijaz
(74) *Attorney, Agent, or Firm* — Stone Creek Services LLC; Alan M Flum

(57) ABSTRACT

A solar panel end clamp that with other components can mount solar panels of various heights or thicknesses to roofs. The solar panel end clamp includes a clamp leg and a clamping member that is pivotally attached to the clamp leg. The clamping member engages the frame top surface and frame side surface of the solar panel. A fastener assembly secures the end clamp assembly to a solar panel mounting platform such as a rail or rail-less mounting structure. As the fastener assembly is tightened, the clamp leg pivots about the panel clamp, the second end of the clamp leg distal to the pivot end moves away from the solar panel, creating pres- (Continued)

sure against the solar panel mounting platform, causing the panel clamp to move downward, and securing the frame top surface and frame side surface.

7 Claims, 9 Drawing Sheets

(56) References Cited

U.S. PATENT DOCUMENTS

| | | | |
|---|---|---|---|
| 4,907,388 A * | 3/1990 | Siahatgar | E04B 2/744 403/252 |
| 5,176,462 A * | 1/1993 | Chen | A47F 5/105 160/135 |
| 6,032,939 A | 3/2000 | Chen | |
| 7,077,855 B2 * | 7/2006 | Curtis | A61H 39/04 606/151 |
| 8,322,454 B2 | 12/2012 | Connell et al. | |
| 8,397,448 B2 | 3/2013 | Brown et al. | |
| 8,615,939 B2 | 12/2013 | Seery et al. | |
| 8,935,893 B2 | 1/2015 | Liu et al. | |
| 9,051,950 B2 | 1/2015 | Jaffari | |
| 9,097,443 B2 | 8/2015 | Liu et al. | |
| 9,142,700 B2 | 9/2015 | Meine et al. | |
| 9,166,524 B2 | 10/2015 | West et al. | |
| 9,249,813 B2 * | 2/2016 | Kalman | B64C 1/066 |
| 9,275,881 B2 | 3/2016 | Nagamine et al. | |
| 9,553,544 B2 | 1/2017 | Nayar | |
| 9,671,136 B2 | 6/2017 | Ash et al. | |
| 2005/0217203 A1 * | 10/2005 | Haddock | F16B 2/10 52/782.1 |
| 2008/0244881 A1 | 10/2008 | Zante | |
| 2013/0112248 A1 | 5/2013 | McPheeters | |
| 2013/0167470 A1 * | 7/2013 | Montgomery | E04G 21/3261 52/705 |
| 2015/0183066 A1 | 7/2015 | Lippert et al. | |

FOREIGN PATENT DOCUMENTS

| | | |
|---|---|---|
| CN | 203423201 U | 2/2014 |
| CN | 204290127 U | 4/2015 |
| DE | 102004049595 B3 | 3/2006 |

OTHER PUBLICATIONS

Universal End Clamp for framed photovoltaic modules Height-adjustable #31500030, downloaded from the Internet at: https://www.shopenergia.com/en/product/2465/Universal-End-Clamp-for-framed-photovoltaic-modules-Height-adjustable-31500030.html on Apr. 16, 2018.

S:Flex System Solutions catalog, Jan. 2018, S:Flex Inc. USA, Greenwood Village, Colorado.

Definition of Solar Panel, Oxford Living Dictionaries, downloaded from the Internet from https://en.oxforddictionaries.com/definition/solar_panel on Oct. 16, 2018.

Definition of Solar Panel, Merriam-Webster Dictionaries, downloaded from the Internet from https://www.merriam-webster.com/dictionary/solar%20panel on Oct. 16, 2018.

* cited by examiner

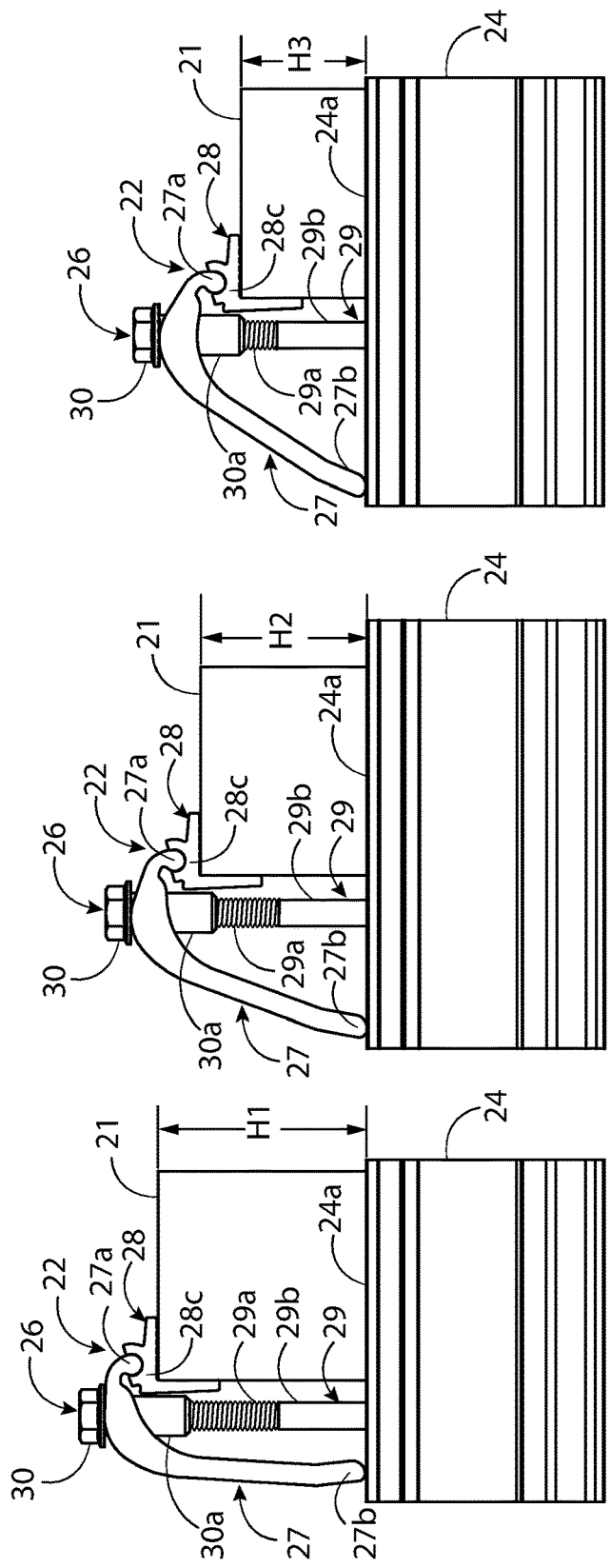

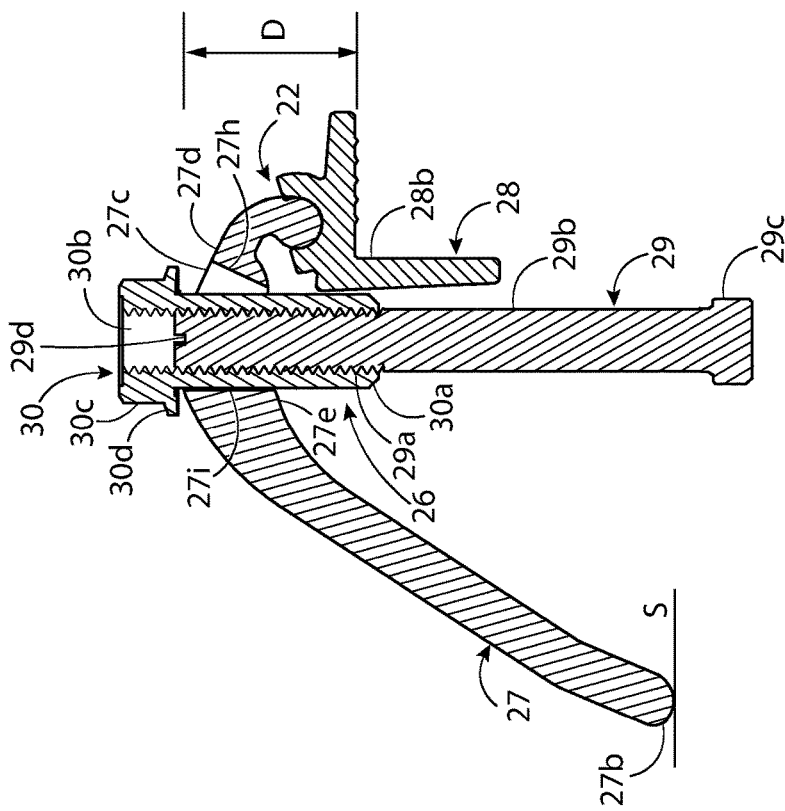
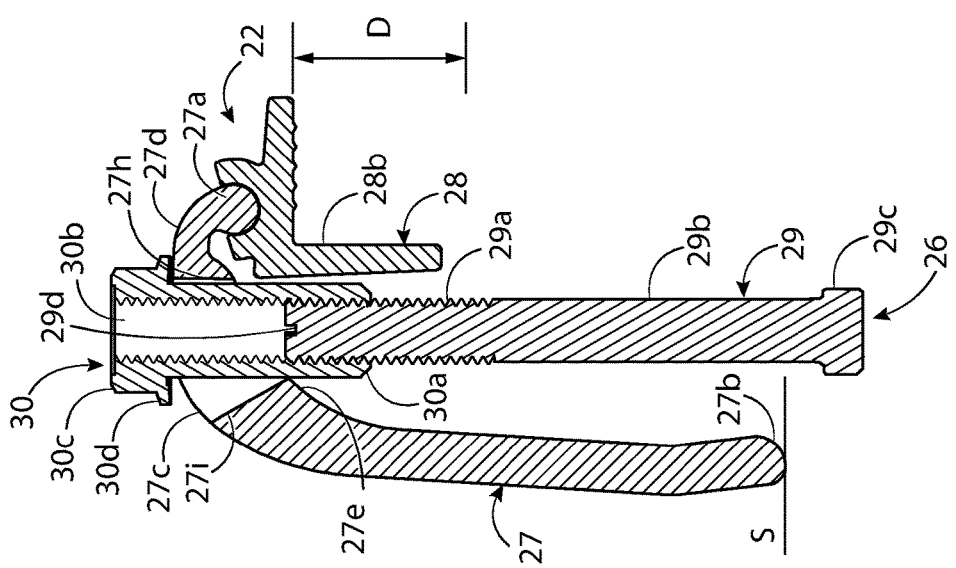
FIG. 14
FIG. 13

END CLAMP FOR ATTACHING SOLAR PANELS TO ROOFS

BACKGROUND

This disclosure relates to devices for mounting solar panels to roofs of building structures. Specifically, this disclosure relates to an over-the-panel clamping devices including solar panel end clamps.

Solar Panels can mount to various types of roof structures, such as pitched shingle roofs, tile roofs, metal roofs, or concrete roofs. Solar panels and solar panel arrays commonly secure to rails that typically span to the length of one or more solar panels. Mounting brackets typically secure the rails the roof structure. So-called rail-less mounting devices can mount solar panels and solar panel arrays to roof structures without rails.

In either instance, over-the-panel clamps, also known as top-clamps, can secure the solar panels to the rail or the rail-less mounting devices. Top-clamps clamp the top of the solar panel frame to a mounting structure, such as a rail or a rail-less mounting bracket, by clamping pressure between the top of the solar panel frame and the mounting structure. Over-the-panel clamps include mid-clamps and end clamps. Mid-clamps, mount between two solar panels. End clamps mount at an outside perimeter or end of an array of solar panels.

Solar panel installers and solar panel mounting device manufacturers seek to simply installation and minimize system costs. One challenge they face is that solar panel frames are not all standardized around a single height. The height can vary according to solar panel manufacturer. For example, solar panel heights often range from 30 mm (1.18 inches) to 50 mm (1.97 inches). Some solar panel mounting device manufacturers offer a range of end clamps, each with different heights to accommodate a corresponding range of solar panel frame heights. Other solar panel mounting device manufacturers offer height adjustable end clamp assemblies where a single end clamp assembly can incrementally accommodate two or more standard solar panel frame heights.

SUMMARY

The inventor recognized that while, height adjustable end clamps on the market could accommodate a fixed set of standard solar panel thicknesses, they could not accommodate a full range of solar panel thickness or heights. The inventor set out to develop a solar panel end clamp that could accommodate a continuous range of standard and non-standard solar panel heights.

The inventor discovered that he could accommodate a continuous range of solar panel thicknesses by developing a solar panel end clamp that includes a clamp leg and a clamping member that is pivotally attached to the clamp leg. The clamping member engages the frame top surface and frame side surface of the solar panel. A fastener assembly secures the end clamp assembly to a solar panel mounting platform such as a rail-less mounting structure or a rail. As the fastener assembly is tightened, the clamp leg pivots away against the panel clamp, the panel clamp moves along the solar panel mounting structure away from the solar panel. This results in the panel clamp moving vertically downward, pressing against the solar panel as the fastener assembly is tightened. The panel clamp self-adjusts so its top inside surface and side inside surface become flush against both a frame top surface and a frame side surface of the solar panel.

The clamp leg can include a pivot end that pivots about a projected portion that projects outward from the panel clamp. The projected portion and pivot end can be so shaped so that the pivot end and the projected portion are slidably captive with the pivot end constrained to rotated about the panel clamp. For example, the projected portion can include a concave groove. The pivot end can be arced (i.e., arcuate) or continuously curved to rotate within the concave groove. The opening of the concave groove can be arced smaller than its radius to restrain movement of the pivot end to sliding within concave groove and prevent upward movement. Alternatively, the pivot end can include the concave groove and the projected portion of the panel clamp can be arcuate or continuously curved to engage the concave groove of the pivot end.

The clamp leg includes a second end. The second end moves along a solar panel mounting structure top surface away from the solar panel as the fastener assembly is tightened. The second end rotates as it moves along the solar panel mounting structure top surface because of the pivot end pivoting within the concave groove. The second end can be radiused or arcuate shaped to allow it to rotate smoothly as it moves along the rail top surface. A radiused or arcuate shape provides a stable engagement surface for the second end as it engages the solar panel mounting structure top surface.

A frictional component can be added to the second end of the clamp leg to prevent slippage between the mounting structure top surface and the end. Similarly, a frictional component can be added to the pivot end to add resistance during rotation and prevent the clamp leg from sliding out of the concave groove of the panel clamp. This frictional component could be knurl pattern, a length-wise grooved pattern, or a serrated pattern in the surface of the second end. The frictional component could be a roughening of the surface of the second end, for example, by sand blasting. The frictional component could be a rubber, rubber-like, or elastomeric gasket that can be embedded into the surface of the second end or wrapped around the second end. For example, a gasket fitted in a length-wise groove of the second end.

This Summary introduces a selection of concepts in simplified form described the Description. The Summary is not intended to identify essential features or limit the claimed subject matter.

DRAWINGS

FIG. 2 illustrates the solar panel end clamp, fastener assembly, a mounting rail, and a solar panel, of FIG. 1 in front view, with the solar panel end clamp adjusted to accommodate a solar panel of height H1.

FIG. 3 illustrates the solar panel end clamp, the fastener assembly, the mounting rail, and the solar panel of FIG. 2, with the solar panel end clamp adjusted to accommodate a solar panel of height H2 where height H2 is less than height H1.

FIG. 4 illustrates the solar panel end clamp, the fastener assembly, the mounting rail, and the solar panel of FIG. 2, with the solar panel end clamp adjusted to accommodate a solar panel of height H3 is less than height H2.

FIG. 13 illustrates a section view of FIG. 10 taken along section lines 10-10 with the panel clamp adjusted to a first position.

FIG. 14 illustrates a section view of FIG. 10 taken along section lines 10-10 with the panel clamp adjusted to a second position that is lower than the first position of FIG. 11.

DESCRIPTION

The terms "left," "right," "top, "bottom," "upper," "lower," "front," "back," and "side," are relative terms used throughout the to help the reader understand the figures. Unless otherwise indicated, these do not denote absolute direction or orientation and do not imply a preference. When describing the figures, the terms "top," "bottom," "front," "rear," and "side," are from the perspective of a typical mounting scenario of a solar panel racking system mounted on a roof top. Top would typically refer to a plan view looking down onto the roof. Front and side typically refer to elevation views. "Height," when referring to solar panels refers to the ordinary meaning of the word when referring to the length, width, and height, of panel. This dimension is often called "depth" or "thickness" in the solar panel industry. Specific dimensions should help the reader understand the scale and advantage of the disclosed material. Dimensions given are typical and the claimed invention is not limited to the recited dimensions.

Figure 1:
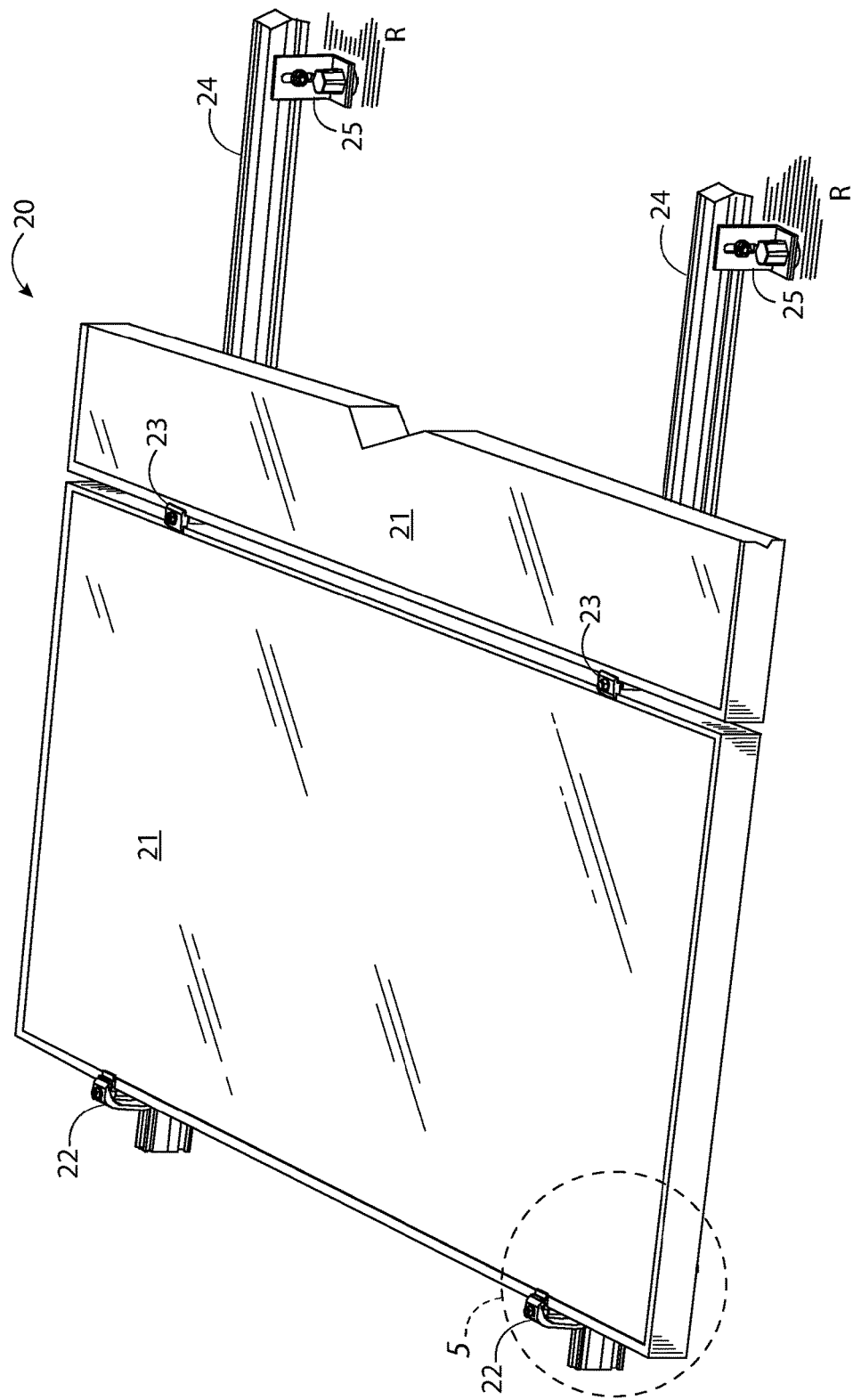
FIG. 1 illustrates a top, front, and perspective view of a solar panel end clamp conceived by the inventor, a solar panel, a fastener assembly, and a mounting rail.
Figure 5:
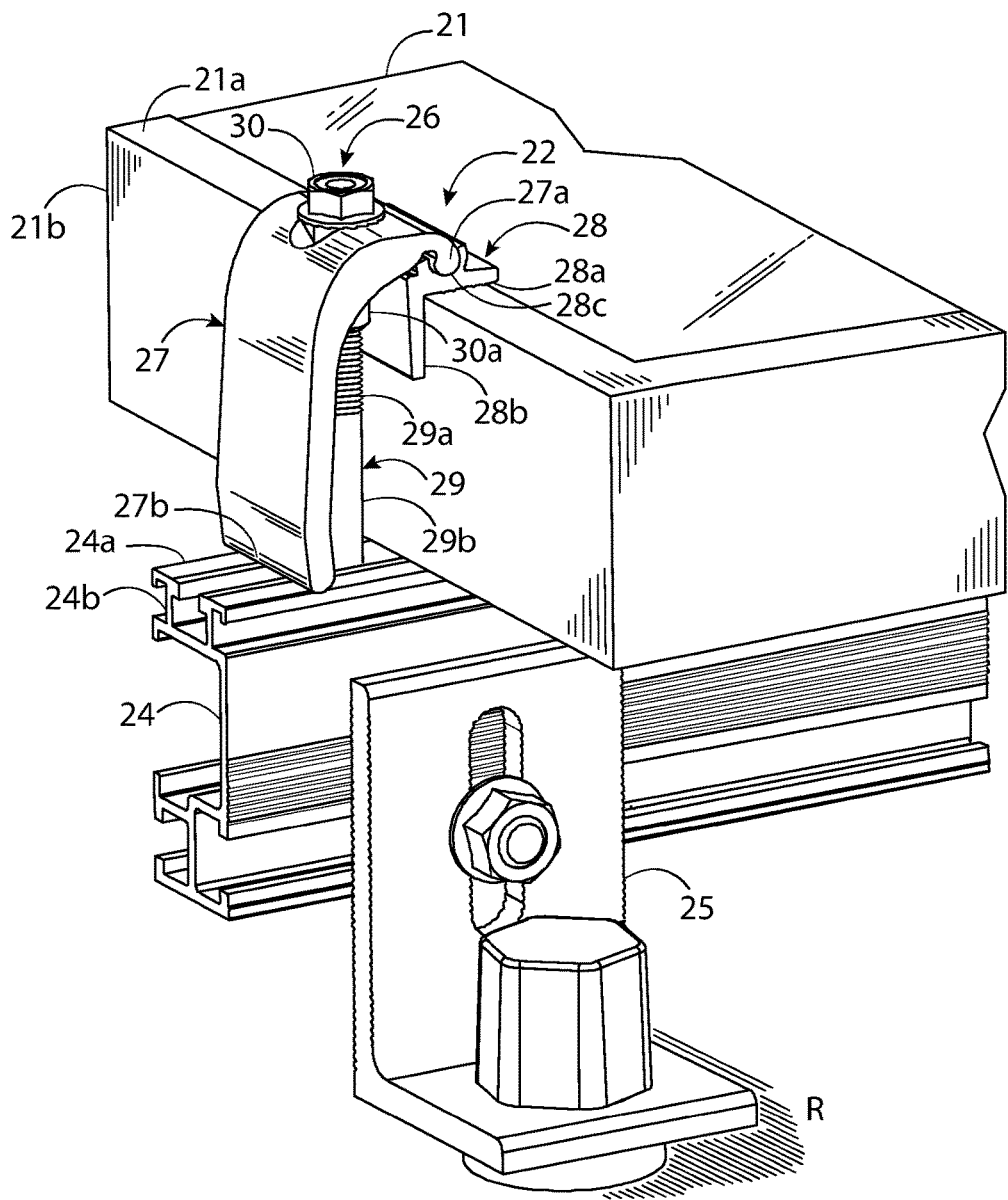
FIG. 5 illustrates a partial view of FIG. 1 enlarged to illustration a portion of the assembly proximate to the solar panel end clamp.

This description is made referring to figures, where like numerals refer to like elements throughout the views. FIG. 1 shows a solar panel mounting system 20 with a solar panel 21, solar panel end clamps 22, and solar panel mid-clamps 23 mounting the solar panel 21 to pair of solar panel mounting structures 24. The solar panel mounting structures 24 are illustrated as rails typically used in a rail-mounted solar panel mounting systems. The solar panel mounting structure 24 can be, for example, a rail, a rail-less solar panel mounting structure, or can be a pair of metal studs (i.e., known in the building trade as metal two by fours). The solar panel mounting structure 24 are typically secured to the surface of a roof R by a mounting bracket 25. The mounting bracket 25 attached to a roof R are also shown in FIG. 5. Referring to FIG. 1, solar panels 21 are typically mounted side-by-side along the solar panel mounting structure 24. In FIG. 1, only one of the solar panels 21 is fully shown with a second of the solar panels 21 partially shown and cutaway on the right-hand side of FIG. 1 for clarity. Solar panel mid-clamps 23 are positioned along the solar panel mounting structure 24 between solar panels 21. Solar panel end clamps 22 are positioned on the outside edges of first and the last of the solar panels 21 in a sequence. Solar panels 21 come in different heights, or thicknesses. Solar panels 21 can come in both standard and non-standard heights. Manufacturers often offer a range of end clamp sizes to accommodate standard solar panel heights. Some manufacturers offer incrementally adjustable solar panel end clamps. The solar panel end clamp 22 conceived and built by the inventor and discussed in this disclosure is continuously adjustable. It can accommodate a wide range of standard and non-standard solar panel thicknesses.

Referring to FIGS. 1 and 5, the solar panel end clamp 22 of the present disclosure provides at least these advantages. First, because the solar panel end clamp 22 is continuously adjustable, it can accommodate nearly any solar panel thickness or height within its adjustment range. Second, the solar panel end clamp 22 can typically include as few as two parts and a fastener assembly 26 (FIG. 5). This reduces manufacturing costs and stocking of items. Third, the solar panel end clamp 22 and fastener assembly 26 together can come preassembled. This simplifies job site installation by reducing the total of parts the installer needs to carry. Fourth, the solar panel end clamp 22 is easy to manufacturer. The as few as two parts can be extruded, cast, molded or otherwise formed. The fastener assembly 26 can be made from off-the-shelf parts.

FIGS. 2-4 illustrate the solar panel end clamp 22, fastener assembly 26, the solar panel mounting structure 24, and the solar panel 21, in front view, with the solar panel end clamp 22 continuously adjustable to accommodate a solar panel 21 of height H1 in FIG. 2, height H2 in FIG. 3, and height H3 in FIG. 4. This is accomplished by pivoting the clamp leg 27 about a panel clamp 28 as the fastener assembly 26 is tightened and loosened. Referring to FIGS. 2-5, the clamp leg 27 includes a pivot end 27a and a second end 27b that is distal to the pivot end 27a. The clamp leg 27 being pivotable about the panel clamp 28 causing the second end 27b to move away from the solar panel 21, creating pressure against the solar panel mounting structure 24, and causing the panel clamp 28 to move downward against, in FIG. 5, the frame top surface 21a and the frame side surface 21b of the solar panel 21.

Referring to FIGS. 2-4, as the fastener assembly 26 is tightened, the clamp leg 27 pivots away against the panel clamp 28, the panel clamp 28 moves along the solar panel mounting structure 24 away from the solar panel 21. This results in the panel clamp 28 moving vertically downward, pressing against the solar panel 21 as the fastener assembly 26 is tightened. Referring to FIG. 5, which is an enlarged view of a portion of FIG. 1, the panel clamp 28 self-adjusts so its top inside surface 28a and the side inside surface 28b remain flush against both a frame top surface 21a and a frame side surface 21b of the solar panel 21. The top inside surface 28a and the side inside surface 28b are adjacent to each other and are typically at a 90° angle relative to each other. This is because the frame top surface 21a and the frame side surface 21b of the solar panel 21 are typically at a 90° angle relative to each other. However, the inventor envisions that the top inside surface 28a and the side inside surface 28b can be constructed at other angles relative to each other to accommodate a solar panel 21 that have a non-90° angle between the frame top surface 21a and the frame side surface 21b.

Figure 6:
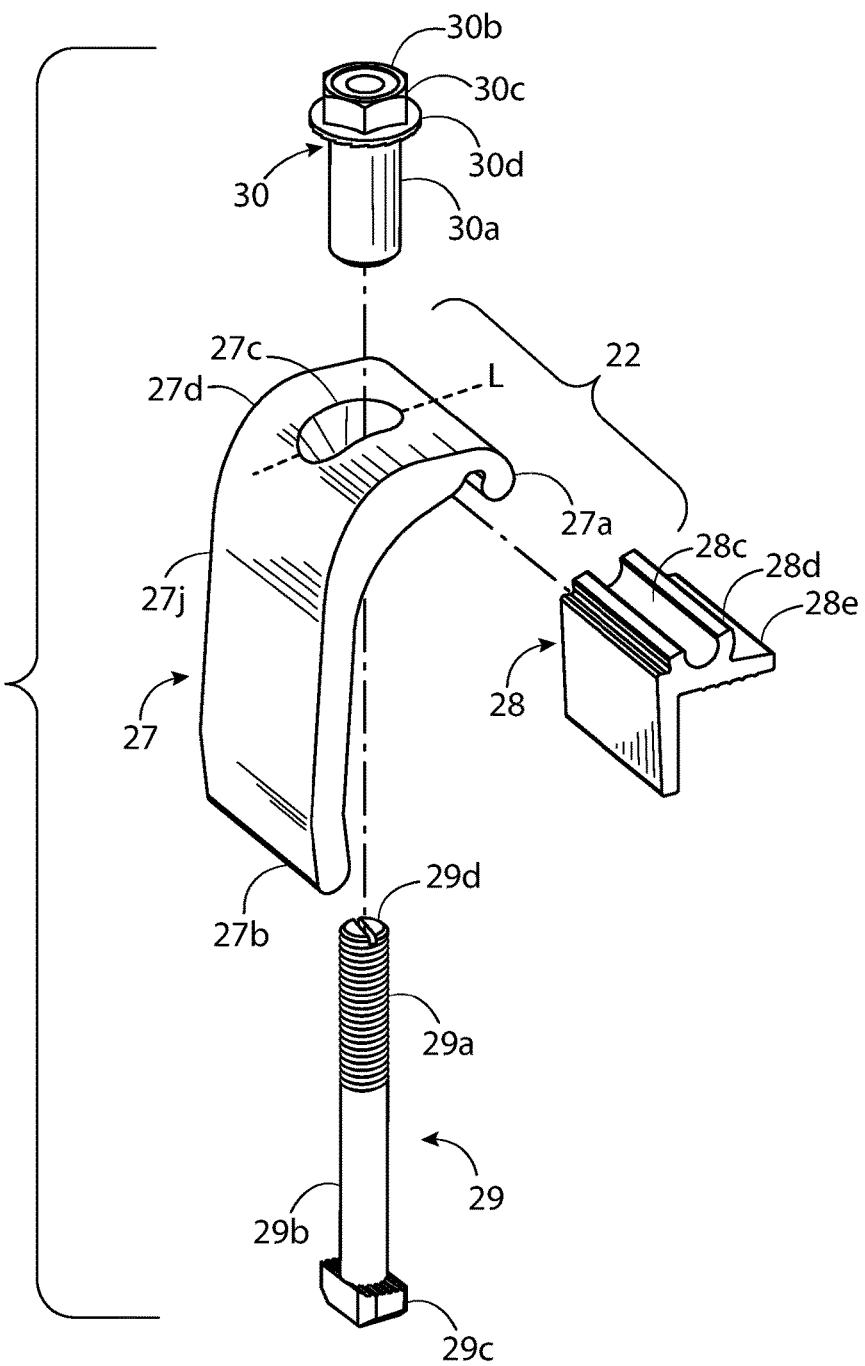
FIG. 6 illustrates the solar panel end clamp of FIG. 1 in top, perspective, and exploded view.
Figure 7:
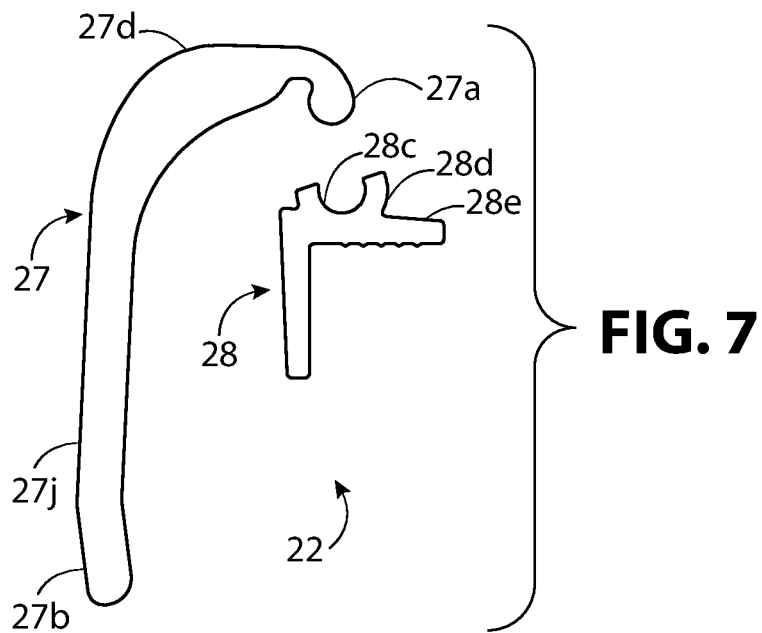
FIG. 7 illustrates the solar panel end clamp of FIG. 1 in front elevation view showing a clamp leg and a panel clamp in exploded away.

Referring to FIGS. 2-5, the pivot end 27a of the clamp leg 27 can pivot about a concave groove 28c in the panel clamp 28. Referring to FIGS. 6 and 7, the concave groove 28c of the panel clamp 28 can be shaped so the pivot end 27a of the clamp leg 27 is slidably and pivotally captive within the concave groove 28c. For example, in FIGS. 6 and 7, the opening of the concave groove 28c can be arced smaller than the maximum edge-to-edge distance within the concave groove 28c to restrain movement of the pivot end 27a to sliding and pivoting within concave groove 28c and prevent upward movement. The arcuate shape can include a portion of a circle, ellipse, spiral, or other continuous curve cross section. The cross section can extend length-wise along the concave groove 28c to form a portion of cylinder. For example, a circular, elliptical, spiral, or other continuous curve cylindrical portion. Similarly, the pivot end 27a can be arcuate shape can include a portion of a circle, ellipse, spiral, or other continuous curve cross section. The cross section can extend length-wise along the pivot end 27a to form a portion of cylinder. The shape of the pivot end 27a would typically partially mirror or be partially complementary in shape to concave groove 28c in order to smoothly pivot.

Referring to FIGS. 2-5, the second end 27b of the clamp leg 27 moves along a mounting structure top surface 24a (in this case, a rail top surface) away from the solar panel 21 as the fastener assembly 26 is tightened. The second end 27b rotates as it moves along the mounting structure top surface 24a because of the pivot end 27a pivoting within the concave groove 28c. The second end 27b can be radiused or arcuate shaped cross section to allow it to rotate smoothly as it moves along the mounting structure top surface 24a. A radiused, arcuate shape (i.e., continuous curve) cross section provides a stable engagement surface for the second end 27b as it engages the mounting structure top surface 24a. The arcuate shape can include a portion of a circle, ellipse, spiral, or other continuous curve cross section. The cross section extends length-wise along the second end 27b to form a portion of cylinder. For example, a circular, elliptical, spiral, or other continuous curve cylindrical portion.

A frictional component can be added to the second end 27b of the clamp leg 27 to prevent slippage between the solar panel mounting structure 24 and the second end 27b. Similarly, a frictional component can be added to the pivot end 27a to add resistance during rotation and prevent the clamp leg 27 from sliding out of the concave groove 28c of the panel clamp 28. This frictional component could be knurl pattern, a length-wise grooved pattern, or a serrated pattern in the surface of the second end 27b. The frictional component could be a roughening of the surface of the second end 27b, for example, by sand blasting. The frictional component could be a rubber, rubber-like, or elastomeric gasket that can be embedded into the surface of the second end 27b or wrapped around the second end 27b. For example, a gasket fitted in a length-wise groove of the second end 27b or a gasket fitted around the pivot end 27a or the second end 27b.

Referring to FIGS. 2-4, heights H1, H2, and H3 could represent typical solar panel heights in the industry. For example, H1 could be 46 mm (1.81 inches), H2 could be 40 mm (1.57 inches), and H3 could be 32 mm (1.26 inches). Because the solar panel end clamp 22 is continuously adjustable rather than incrementally adjustable, it can accommodate a wide range of standard and non-standard solar panel heights. For example, H1 could be 50 mm (1.97 inches), H2 could be 40 mm (1.57 inches), and H3 could be 30 mm (1.18 inches), where 50 mm and 30 mm typically are non-standard heights. The solar panel end clamp 22 can be continuously adjusted to the height anywhere between its maximum and minimal range. A typical minimal and maximal range can be 30 mm (1.18 inches) to 50 mm (1.97 inches). However, the inventor envisions that wider, or different ranges can be accommodated by changing the length of the clamp leg 27 or modifying the fastener assembly 26 to accommodate higher panel heights.

Figure 8:
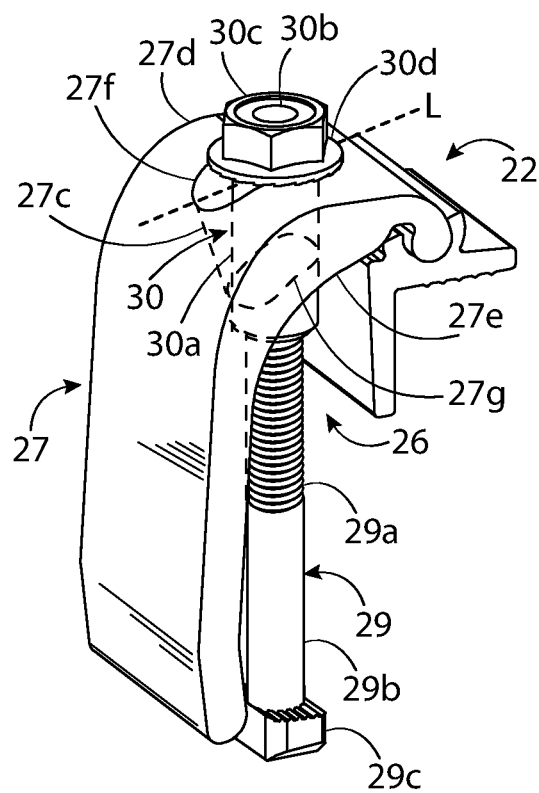
FIG. 8 illustrates the solar panel end clamp of FIG. 1 in top, front, and perspective view with dashed lines indicated portions of a slotted aperture of the clamp leg and of the fastener assembly hidden from view.
Figure 9:
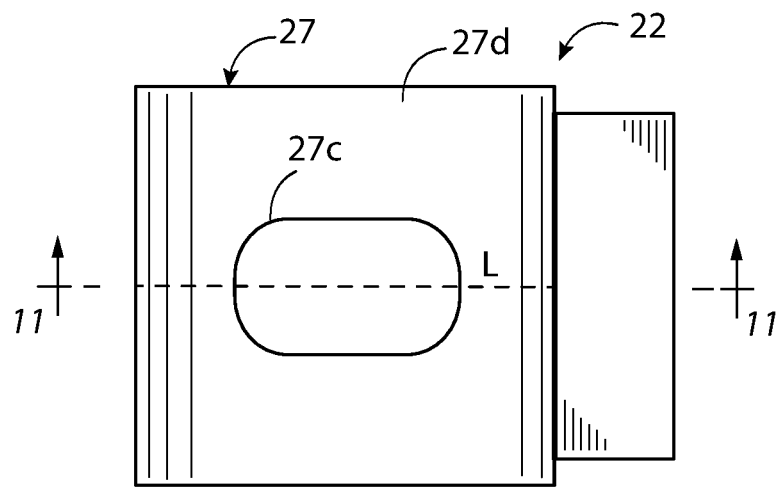
FIG. 9 illustrates the solar panel end clamp of FIG. 1 in top plan view.
Figure 10:
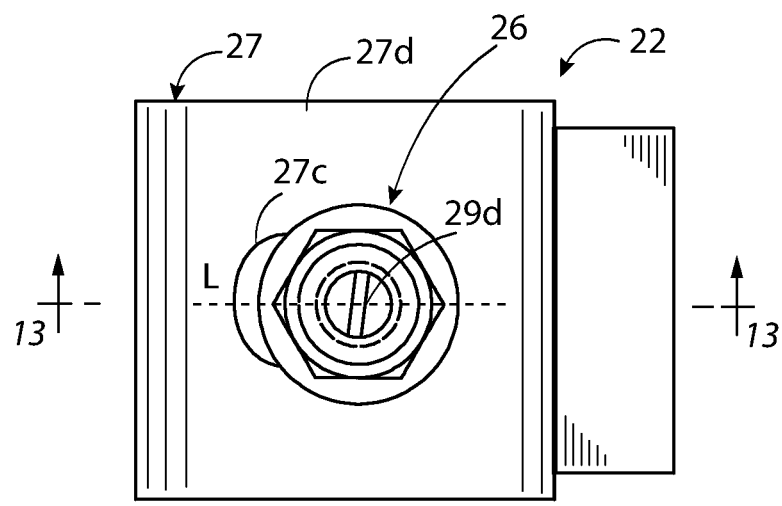
FIG. 10 illustrates the solar panel end clamp and fastener assembly of FIG. 1 in top plan view.
Figure 11:
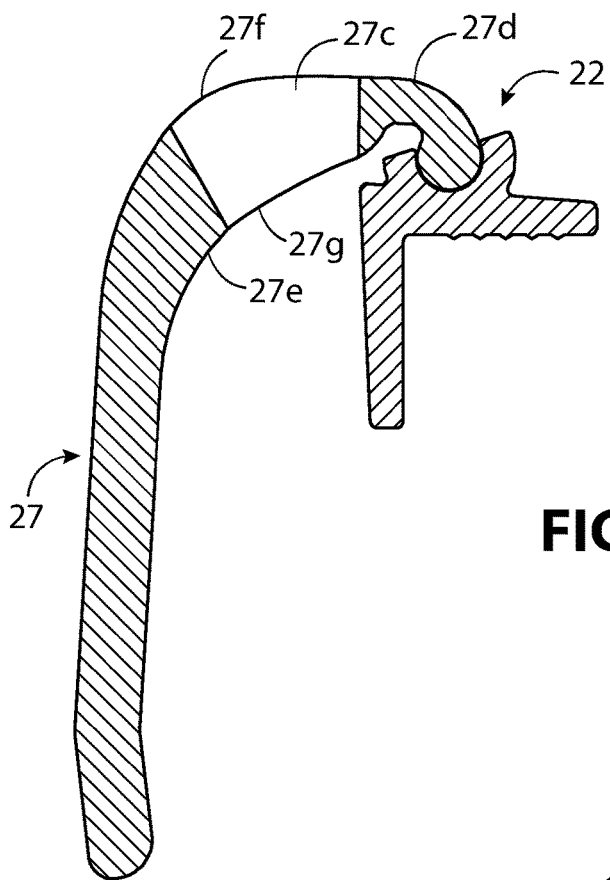
FIG. 11 illustrates a section view of FIG. 9 taken along section lines 10-10 with the threaded fastener and threaded receiver removed for clarity.
Figure 12:
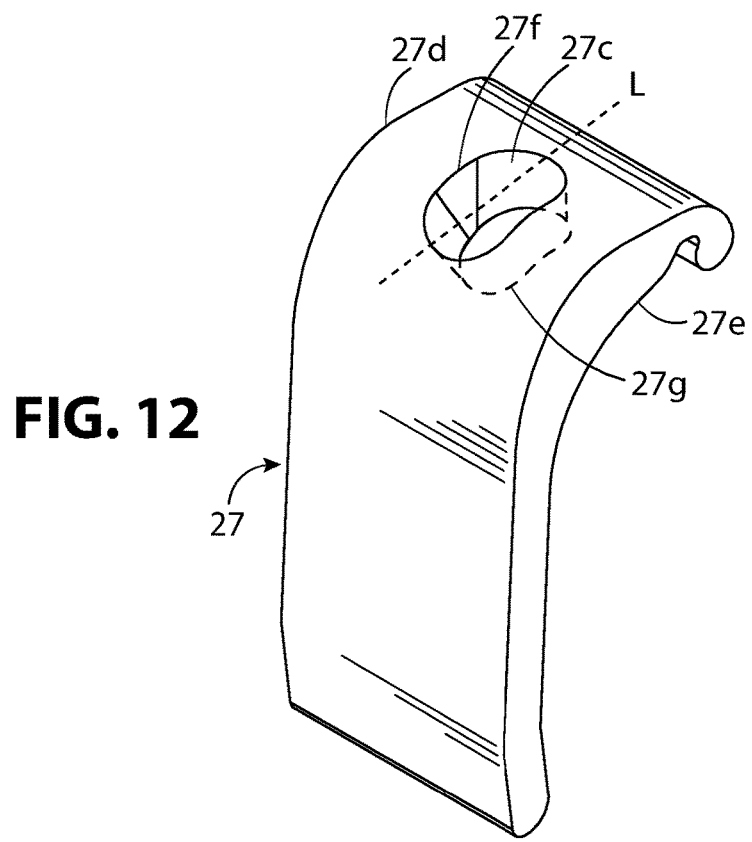
FIG. 12 illustrates a top perspective view of the clamp leg.

Referring to FIGS. 6, 8-14, the clamp leg 27 includes a slotted aperture 27c that receives the fastener assembly 26 (FIGS. 10, 13, and 14). Referring to FIGS. 6, 8, 9, 10 and 12, the slotted aperture 27c can be slotted to constrain movement with respect to the clamp leg top surface 27d to along the length-wise axis L of the clamp leg 27. Referring to FIGS. 8 and 12-14, the slotted aperture 27c is slotted on both the clamp leg top surface 27d and the clamp leg bottom surface 27e. Referring to FIGS. 8 and 11-14, the slotted aperture 27c can taper inward from clamp leg top surface 27d to the clamp leg bottom surface 27e. Referring to FIGS. 8, 11 and 12, the first opening 27f of the slotted aperture 27c on the clamp leg top surface 27d is larger than the second opening 27g. Referring to FIG. 13, the solar panel end clamp 22 and fastener assembly 26 are in their maximum position, a distance D from their minimal position in FIG. 14 with the second end 27b pressed against mounting surface S. The first aperture edge 27h (i.e., the edge closest to the pivot end 27a) is approximately parallel to the to the side inside surface 28b of the panel clamp 28. The second aperture edge 27i is angled (i.e., oblique with reference to the first aperture edge 27h) creating the taper. Referring to FIG. 14, the solar panel end clamp 22 and the fastener assembly 26 are in their minimum position, a distance D from the maximum position in FIG. 13. The second aperture edge 27i is approximately parallel to the to the side inside surface 28b of the panel clamp 28. The first aperture edge 27h is angled (i.e., oblique with respect to the second aperture edge 27i) creating the taper. The second end 27b of the clamp leg 27 is swung away from the panel clamp 28 along the mounting surface S.

Referring to FIGS. 2-5, the fastener assembly 26 can include one or more components for securing the solar panel end clamp 22 to the solar panel mounting structure 24 and the solar panel 21. The fastener assembly 26 can include one or more components for securing the solar panel end clamp 22 and the solar panel 21 to another type of solar panel mounting platform other than a solar panel mounting structure 24. For example, the fastener assembly 26 could be a threaded fastener such as a sheet metal screw secured to a platform made from metal studs or a pair of c-channels. In FIGS. 2-5, the fastener assembly 26 includes a threaded fastener 29 and a fastener retainer 30. The threaded fastener 29 illustrated in FIGS. 2-5, 6, 8, 13 and 14 is a t-bolt. The fastener retainer 30 illustrated in these same figures is an extended shoulder collar nut. Extended shoulder collar nuts are typically used in the automotive industry. In FIGS. 2-5, as the fastener retainer 30 is tightened, the threading 29a of threaded fastener body 29b gets taken up with the hollow threaded body 30a of the fastener retainer 30. Referring to FIG. 5, the panel clamp 28 is pushed downward against both the frame top surface 21a and the frame side surface 21b of the solar panel 21 by the pivoting of the clamp leg 27 outward along the solar panel mounting structure 24 as the fastener retainer 30 is tightened. The threaded fastener head 29c, not shown in FIG. 5, is captively retained within a length-wise slot 24b of the solar panel mounting structure 24 and remains stationary as the fastener retainer 30 is loosened or tightened. FIGS. 6, 8, 13, and 14 illustrate threaded fastener 29 in its entirety, including the threading 29a, the threaded fastener body 29b, and the threaded fastener head 29c.

Referring to FIGS. 6, 8,13, and 14, the hollow threaded body 30a of the fastener retainer 30 can include a threaded hollow interior 30b that is concentric about the length-wise axis of the fastener retainer 30. The fastener retainer 30 can include a retainer head 30c, such as a hexagonal shaped head, for receiving a tool, and a shoulder 30d that stops the fastener retainer 30 against the slotted aperture 27c in the clamp leg top 27d but allows the hollow threaded body 30a pass through the slotted aperture 27c. Referring to FIGS. 6, 10, 13, and 14, the threaded fastener 29 can include a slot 29d positioned at the end of the threaded fastener 29 distal to the threaded fastener head 29c (FIGS. 6, 13 and 14).

Referring to FIGS. 6 and 7, the clamp leg 27 illustrated is shaped substantially like an inverted L with the clamp leg top surface 27d forming the base of the L with side portion 27j forming the stem of the L. The pivot end 27a extends downward toward the panel clamp 28. The second end 27b is shown extending inward toward the panel clamp 28. The concave groove 28c is indented in the surface of a projected portion 28d that projects upward from the top outside surface 28e of the panel clamp 28. The outside shape of the projected portion 28d can be shaped to it acts one or more end stops for the movement of the clamp leg 27. Alternately, it could be shaped to not interfere with the movement of the clamp leg 27.

Referring to FIG. 5, the inventor envisions that any way that allows the clamp leg 27 to pivot about the panel clamp 28 causing the second end 27b to move away from the solar panel 21 and press against the solar panel mounting structure 24 causing the panel clamp 28 to move downward against the frame top surface 21a and the frame side surface 21b falls within the scope of the solar panel end clamp 22. For example, in FIGS. 15 and 16, the pivot end 27a of the clamp leg 27 can include a concave groove 27k. The in the panel clamp 28 can include a projected portion 28d projecting away from the top outside surface 28e, essentially reversing the pivoting mechanism shown in FIG. 5. The projected portion 28d can be shaped like the pivot end of FIG. 5. Continuing to refer to FIGS. 15 and 16, alternatively, the projected portion 28d can be any arcuate shape or continuous curve the complements the shape of the concave groove 27k of the clamp leg 27. The concave groove 27k can be shaped so the projected portion 28d of the panel clamp 28 is slidably and pivotally captive within the concave groove 27k. For example, the opening of the concave groove 27k can be arced smaller than the maximum edge-to-edge distance within the concave groove 27k to restrain movement of the projected portion 28d to sliding and pivoting within concave groove 28k and prevent upward movement. The arcuate shape can include a portion of a circle, ellipse, spiral, or other continuous curve cross section. The cross section can extend length-wise along the projected portion 28d to form a portion of cylinder. For example, a circular, elliptical, spiral, or other continuous curve cylindrical portion.

Figure 15:
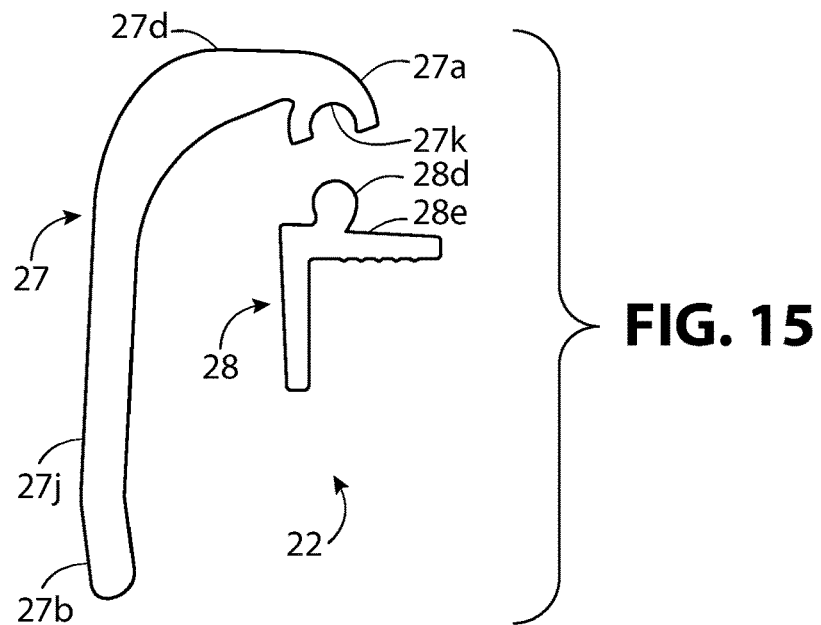
FIG. 15 illustrates an alternative version of the solar panel end clamp in front elevation view showing a clamp leg and a panel clamp in exploded away.
Figure 16:
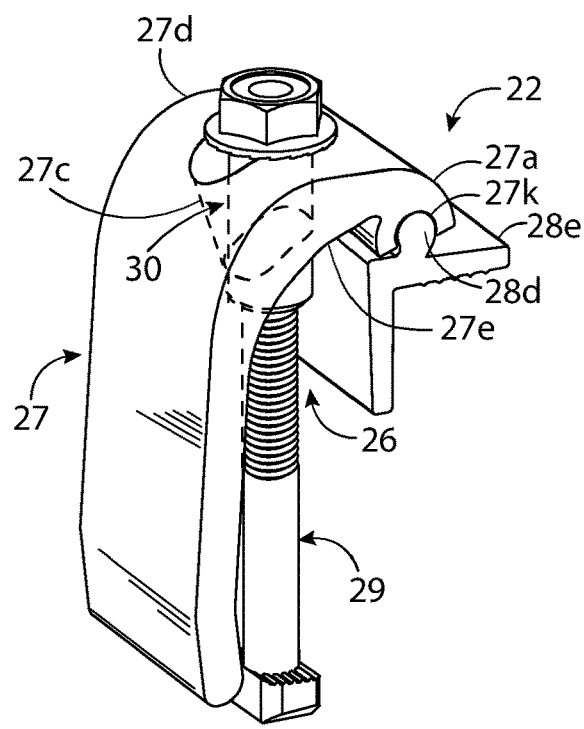
FIG. 16 illustrates the solar panel end clamp of FIG. 15 in top, front, and perspective view with dashed lines indicated portions of a slotted aperture of the clamp leg and of the fastener assembly hidden from view.

The other elements of the clamp leg 27 and the panel clamp 28 in FIGS. 15 and 16 can remain the same as described for FIGS. 7 and 8. For example, in FIG. 15, the clamp leg 27 can include the second end 27b, side portion 27j and clamp leg top surface 27d as previously described. In FIGS. 16, the solar panel end clamp 22 accept a fastener assembly 26 with a fastener retainer 30 and threaded fastener 29 through a slotted aperture 27c through the clamp leg top surface 27d and the clamp leg bottom surface 27e. The slotted aperture can be tapered as previously describe.

As another example, the projected portion 28d and the pivot end 27a can be hinge such as a pivot hinge, barrel hinge, or a mortise hinge as long as these hinges are structure so the clamp leg 27 to pivot about the panel clamp 28 causing the second end 27b to move away from the solar panel 21 and press against the solar panel mounting structure 24 causing the panel clamp 28 to move downward against the frame top surface 21a and the frame side surface 21b falls within the scope of the solar panel end clamp 22 as described for FIG. 5.

This disclosure described a device for mounting a solar panel 21 (FIGS. 1-5) to a roof R (FIGS. 1 and 5). Particularly, the solar panel end clamp 22 of FIGS. 1-11, 13, and 14. This disclosure does not intend to limit the claimed invention to the examples and variations described in the specification. Those skilled in the art will recognize that variations will occur when embodying the claimed invention in specific implementations and environments. For example, while the clamp leg 27 of FIGS. 6 and 7 is depicted as an inverted L-shape, the shape can be modified so the pivot end 27a pivots within the concave groove 28c while the second end 27b slides and rotates along the solar panel mounting structure 24 of FIGS. 2-4 or other solar panel mounting structures. For example, referring to FIGS. 6 and 7, the L-shape can have less radius or no radius at the juncture between the side portion 27j of the clamp leg 27 and the clamp leg top surface 27d. The angle between the side portion 27j and the clamp leg top surface 27d can be a right angle or can be an obtuse angle. It can be an acute angle if the top extends sufficiently so the second end 27b or the side portion 27j do not interfere with the threaded fastener 29 (FIG. 6).

It is possible to implement certain features described in separate embodiments in combination within a single embodiment. Similarly, it is possible to implement certain features described in one example or instance either separately or in combination in multiple examples or instances. For example, in FIGS. 6 and 7, the pivot end 27a and the second end 27b can include a frictional component as described. Different frictional components can be used for the pivot end 27a and the second end 27b. One or both may include a frictional component. The concave groove 28c can include a frictional component and the pivot end 27a might include a frictional component. As another example, the fastener retainer 30 was illustrated and described as an extended shoulder nut. A conventional nut can be readily substituted. The threaded fastener 29 was illustrated as a t-bolt, a conventional bolt can be readily used either combined with the conventional nut, extended shoulder nut, and other of the fastener retainer 30. The inventor envisions these variations can be readily combined with other variations described. The inventor envisions these variations fall within the scope of the claimed invention.

While the examples, exemplary embodiments, and variations are helpful to those skilled in the art in understanding the claimed invention, the claimed invention is defined solely by these claims and their equivalents.

The appended claims are not to be interpreted as including means-plus-function limitations unless a claim explicitly evokes the means-plus-function clause of 35 USC § 112(f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the present invention.

"Optional" or "optionally" is used throughout this disclosure to describe features or structures that are optional. Not using the word optional or optionally to describe a feature or structure does not imply that the feature or structure is essential, necessary, or not optional. Using the word "or," as used in this disclosure is to be interpreted as the Boolean meaning of the word, i.e., an inclusive "or," not an exclusive "or." For example, the phrase "A or B" can mean any or all the following: A without B, B without A, A together with B.

What is claimed is:

1. A device for mounting a solar panel to a solar panel mounting structure, the solar panel mounting structure mountable to a roof, the solar panel including a rectangular top surface surrounded by a frame with planar frame portions, the planar frame portions include a frame top surface and a frame side surface projecting downward from the frame top surface, comprising:
   a solar panel end clamp including a clamp leg and a panel clamp;
   the clamp leg includes a pivot end and a second end distal to the pivot end;
   the panel clamp includes a projected portion that projects from a top outside surface of the panel clamp and is slidably captive with the pivot end, a top inside surface projecting downward with respect the top outside surface, and a side inside surface adjacent to the top inside surface;
   a fastener assembly; and
   the fastener assembly being securable to the solar panel mounting structure and the clamp leg causing the pivot end to downwardly engage and pivot about the projected portion, the second end to move away from the solar panel, the panel clamp to move downward, the top inside surface to press downward against the frame top surface, the side inside surface to press against the frame side surface, and the solar panel to press against the solar panel mounting structure;
   the clamp leg includes a clamp leg top surface, a clamp leg bottom surface opposite the clamp leg top surface, and a slotted aperture therethrough;
   the slotted aperture receives the fastener assembly, the slotted aperture includes a first aperture edge and a second aperture edge defining lengthwise extents of the slotted aperture and each extending from the clamp leg top surface to the clamp leg bottom surface; and
   with the second end fully extended away from the panel clamp, the second aperture edge is parallel to the side inside surface of the panel clamp and the first aperture edge is oblique with the side inside surface.

2. The device of claim 1, wherein:
   the projected portion includes a concave groove;
   the pivot end is slidably captive within the concave groove; and
   the pivot end downwardly and pivotably engages the concave groove causing the second end to move away from the solar panel and the panel clamp to press downward against the solar panel mounting structure as the fastener assembly is secured to the solar panel mounting structure.

3. The device of claim 1, wherein:
   the top inside surface perpendicularly extends directly from the side inside surface.

4. A device for mounting a solar panel to a solar panel mounting structure, the solar panel including a rectangular top surface surrounded by a frame with planar frame portions, the planar frame portions include a frame top surface and a frame side surface projecting downward from the frame top surface, comprising:
   a solar panel end clamp including a clamp leg and a panel clamp;
   the clamp leg includes a pivot end and a second end that is distal to the pivot end;
   the pivot end downwardly engages an upward facing surface of the panel clamp and is slidably captive and pivotable therewith;
   a fastener assembly being securable to both the solar panel mounting structure and the clamp leg; and
   the clamp leg, the panel clamp, and the fastener assembly arranged and structured so that tightening the fastener assembly to the clamp leg and the solar panel mounting structure causes the clamp leg to captively pivot about the panel clamp, the second end to move away from the solar panel, the panel clamp to move downward against the frame top surface and press against the frame top surface and the frame side surface, and the solar panel to press against the solar panel mounting structure;
   the clamp leg includes a clamp leg top surface, a clamp leg bottom surface opposite the clamp leg top surface, and a slotted aperture therethrough;
   the slotted aperture receives the fastener assembly;
   the panel clamp includes a side inside surface that engages the frame side surface;
   the slotted aperture includes a first aperture edge and a second aperture edge defining lengthwise extents of the slotted aperture and each extending from the clamp leg top surface to the clamp leg bottom surface; and
   with the second end fully extended away from the panel clamp, the second aperture edge is parallel to the side inside surface of the panel clamp and the first aperture edge is oblique with the side inside surface.

5. The device of claim 4, wherein:
   the panel clamp includes a concave groove;
   the pivot end is slidably captive within the concave groove; and
   the pivot end downwardly and pivotably engages the concave groove causing the second end to move away from the solar panel and the panel clamp to press downward against the solar panel mounting structure as the fastener assembly is secured to the solar panel mounting structure.

6. A device for mounting a solar panel to a solar panel mounting structure, the solar panel including a rectangular top surface surrounded by a frame with planar frame portions, the planar frame portions include a frame top surface and a frame side surface projecting downward from the frame top surface, comprising:
   a solar panel end clamp including a clamp leg and a panel clamp;
   the clamp leg includes a pivot end and a second end that is distal to the pivot end;
   the pivot end downwardly engages an upward facing surface of the panel clamp and is slidably captive and pivotable therewith;
   a fastener assembly being securable to both the solar panel mounting structure and the clamp leg; and
   the clamp leg, the panel clamp, and the fastener assembly arranged and structured so that tightening the fastener assembly to the clamp leg and the solar panel mounting structure causes the clamp leg to captively pivot about the panel clamp, the second end to move away from the solar panel, the panel clamp to move downward against the frame top surface and press against the frame top surface and the frame side surface, and the solar panel to press against the solar panel mounting structure;

the panel clamp includes a side inside surface and a top inside surface downwardly facing and perpendicularly extending directly away from the side inside surface; and tightening the fastener assembly to the clamp leg and the solar panel mounting structure causes the top inside surface to move downward against the frame top surface and the side inside surface to press against the frame side surface.

7. The device of claim 6, wherein:

the side inside surface is substantially planar across its entire surface; and the top inside surface is substantially planar across its entire surface.

\* \* \* \* \*